United States Patent [19]
Cullen

[11] 3,864,906
[45] Feb. 11, 1975

[54] CHAIN LINK

[75] Inventor: Clifford Frank Cullen, Lower Templestowe, Victoria, Australia

[73] Assignee: Vickers Ruwolt Pty. Ltd., Victoria, Australia

[22] Filed: June 22, 1973

[21] Appl. No.: 372,506

[52] U.S. Cl. .......................... 59/84, 59/90
[51] Int. Cl. .............................. F16g 15/12
[58] Field of Search ............ 59/84, 90, 80, 82

[56] References Cited
UNITED STATES PATENTS

| | | | |
|---|---|---|---|
| 165,541 | 7/1875 | Chamberlin | 59/90 |
| 259,959 | 6/1882 | Wilson | 59/90 |
| 2,430,966 | 11/1947 | Taylor | 59/90 |
| 2,650,470 | 9/1953 | Sennholtz | 59/90 |
| 3,453,823 | 7/1969 | Mundt | 59/90 |

FOREIGN PATENTS OR APPLICATIONS

| | | | |
|---|---|---|---|
| 15,848 | 2/1914 | Great Britain | 59/84 |

Primary Examiner—C. W. Lanham
Assistant Examiner—Gene P. Crosby
Attorney, Agent, or Firm—Cushman, Darby & Cushman

[57] ABSTRACT

A chain link having a main peripheral bar formed as a closed loop, and a transverse bar extending between and connected to opposite side portions of the peripheral bar. The side portions of the peripheral bar progressively decrease in cross-sectional size from each end of the link towards the transverse part, and the cross-sectional size of the transverse bar is substantially the same as that part of the side portions to which it is connected, so that the link has its greatest cross-sectional size at the ends. The cross-sectional shape of each end portion of the link is defined by a curved inside surface which faces towards the transverse bar, and a curved outside surface, the curve of the inside surface being flatter than that of the outside surface.

4 Claims, 5 Drawing Figures

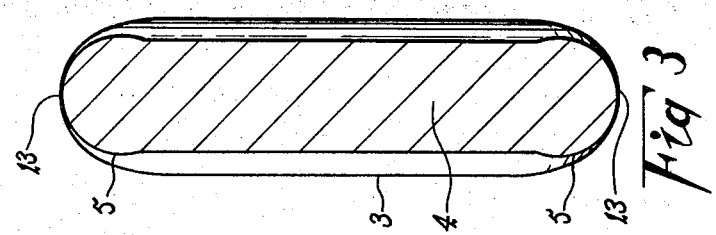
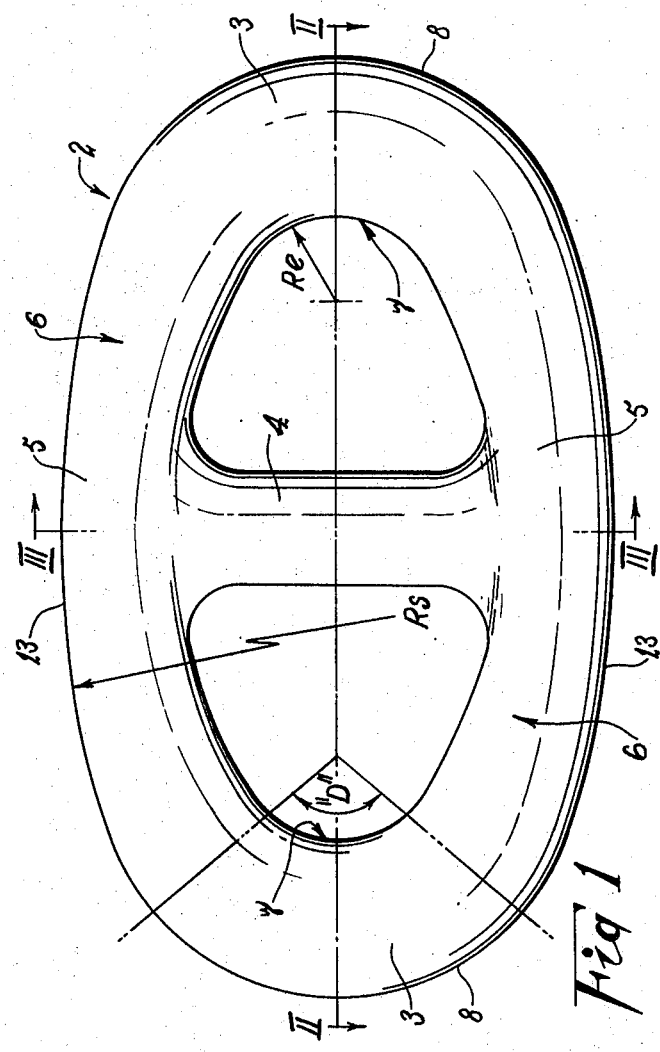
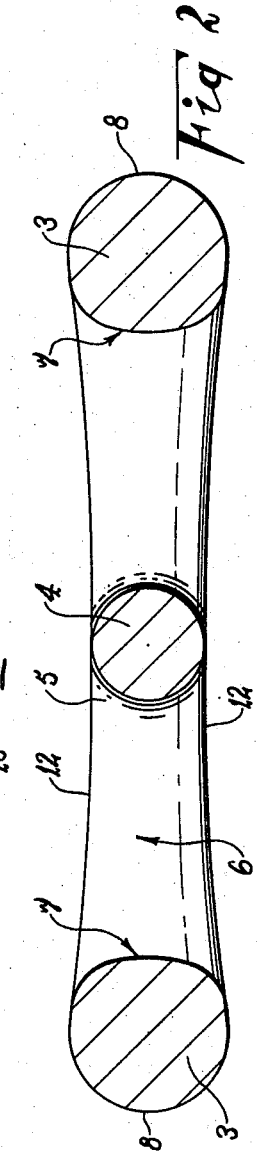

CHAIN LINK

This invention relates to chain links, and in particular although not exclusively concerned with such links for use with heavy duty chains as may be used with earth moving and excavating equipment. By way of example, a link according to the invention is particularly suited for use in the rigging by which a drag-line bucket is suspended from an excavator and through which the bucket is controlled.

Heavy duty chains and especially those used with earth moving and excavating equipment, generally require rather bulky links because of the loading to which they are subjected during use. The drag-line chains of an excavator for example, may be subjected to loads in the region of 500,000 pounds.

The body of conventional chain links is usually made of metal bar or rod of circular crosssectional shape, and in plan view may be rectangular, trapezoidal or elliptical. In most chains, maximum wear occurs at the ends of the links where they bear against one another, and the link dimensions are determined with that in mind, but the cross-sectional size selected for the ends is generally carried through the entire body of the link with consequent material waste and unnecessarily high link weight.

It is a principal object of the present invention to provide a chain link of reduced weight but having substantially the same strength as a conventional link of comparable size.

According to the present invention, there is provided a chain link including; an elongate body section comprising a bar formed as a closed loop; a transverse bar extending between and interconnecting two longitudinal side portions of said body section, at a location intermediate the length of said body section; the cross-sectional size of said body section bar being smaller intermediate the length of each said side portion than at the end portions of said body section.

The following description refers in more detail to these essential features and further optional features of the invention. To facilitate understanding of the invention, reference is made to the accompanying drawings where these features are illustrated in preferred form. It is to be understood however, that the essential and optional features of the invention are not limited to the specific forms of thses features as shown in the drawings.

In the drawings:

FIG. 1 is a plan view of a typical link made in accordance with the invention;

FIG. 2 is a cross-sectional view taken along lines II—II of FIG. 1;

FIG. 3 is a cross-sectional view taken along lines III—III of FIG. 1;

Figure 4:
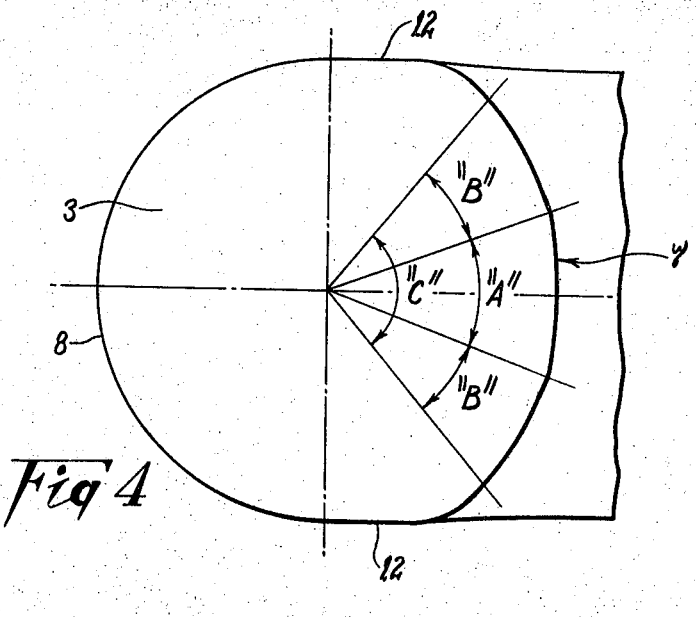
FIG. 4 is an enlarged transverse crosssectional view of an end portion of the link.

A link according to the invention includes an elongated body 2 formed of rod or bar having a greater cross-sectional size at the end portions 3 of the link cross-sectional size at the end portions 3 of the link body 2 than intermediate the length of the link body 2, and a transverse bar 4 extending between and interconnecting the regions 5 of reduced cross-sectional size in the two longitudinal side portions 6 or arms of the link. Preferably, the link body 2 is elliptical when viewed in plan, as shown in FIG. 1, since that shape is generally found to provide a stronger construction than is possible with the available alternatives.

In the preferred construction shown in the drawings, each end portion 3 of the link is formed with non-circular sectional shape, but has inside and outside curved surfaces 7 and 8 respectively — i.e., convex when considered in transverse cross-section — as shown in FIG. 2. The inside surface 7, or part thereof, forms the bearing surface which normally engages a corresponding surface of an associated link, and that surface is ideally formed with a flatter curvature than the oppositely directed outside surface 8.

The inside surface of any portion of the link body 2 is to be understood as being that surface which faces an oppositely disosed portion of the link. Each outside surface of course faces in substantially the opposite direction to its associated inside surface. The surfaces extending between the inside and outside surfaces will be referred to as transverse surfaces.

Figure 5:
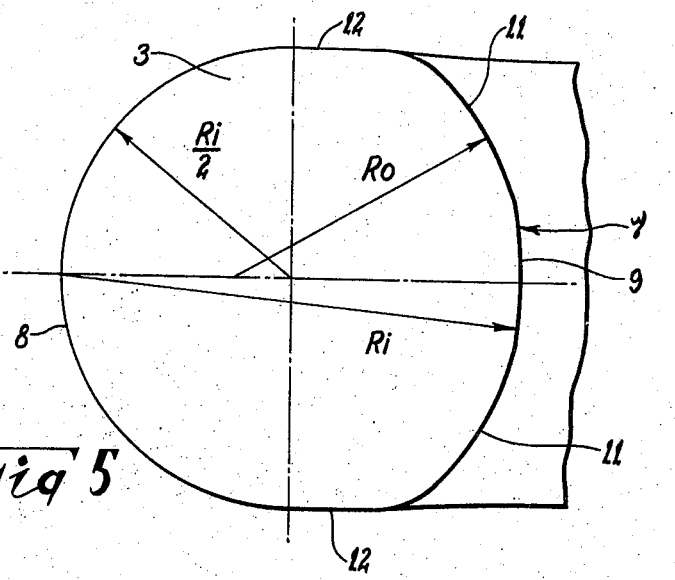
FIG. 5 is a view similar to FIG. 4.

In the particular embodiment shown in the drawings, the inside surface 7 of each end portion 3 is defined by three arcuate faces; an inner arcuate face 9 and two substantially equal outer arcuate faces 11 merging with opposite sides respectively of the inner face 9 (see FIGS. 4 and 5). The three arcuate faces have their centres located on the longitudinal axis of the link body 2, so that the two outer faces 11 are in fact concentric, and the angles 'A' and 'B' subtended by the inner and outer faces respectively, may be approximately 40° and 30° so that the total angle subtended by the three arcuate faces 9 and 11 is approximately 100°. The longitudinal axis preferably bisects the angle 'C' so that the bearing surface 7 is arranged substantially symmetrical about that axis.

The relationship between the inner and outer arcuate face 9 and 11 is preferably such that the radius (Ro) of each outer face 11 equals one half the radius (Ri) of the inner face 9 plus 12% of Ri. That formula however, is a guide-line only since in practice it will generally be convenient to adopt an easily determinable radius rather than a calculated radius requiring extremely fine measurements. For example, if Ri equals 3.25 inches, Ro calculated by the above formula is 2.015 inches whereas in practice 2 inches may be adopted for Ro without loss of advantage.

With the foregoing arrangement, the outside surface 8 of each end portion 3 can be formed by a single arc which, in the preferred embodiment shown, has a radius approximately equal to one half Ri, and the centre of that radius is located on the longitudinal axis of the link substantially midway between the inside and outside surfaces 7 and 8 of the respective end portion 3.

For convenience of description, the distance between the inside and outside surfaces 7 and 8 of each end portion 3 will be referred to as the section width, and the distance between the transverse surfaces 12 (see FIGS. 4 and 5) will be referred to as the section depth. Preferably, the section depth is substantially equal to the section width, and the transverse surfaces 12 may be flat as shown, and/or curved in transverse cross-section according to requirements.

As shown in FIG. 1, the preferred link is elliptical in plan view, and it is further preferred that each end portion 3 extends through an arc subtending an angle 'D' of at least 95° (preferably approximately 100°) without substantial change in cross-sectional shape or size. Ideally, the subtended angle 'D' is bisected by the link centre line as is also shown in FIG. 1. In the illustrated embodiment the inside surface 7 of each end portion 3 follows a curve having a radius Re which is substantially equal to Ro.

In use the outer faces 11 define the bearing surface of the link, and a clearance initially exists between the inner face 9 and the adjacent surface of an associated link, but as wear takes place the inner face 9 progressively decreases in size and the bearing surface increases in size. Such an arrangement has obvious practical advantages. For example, larger links are generally cast so that some inaccuracy in dimensions is to be expected, and the aforementioned clearance space avoids or minimizes the possibility of "point" contact in new links which results in relatively high localized wear.

The cross-sectional shape described for the link end portions 3 is preferably continued through the side arms 6 of the link, although a gradual transition to a circular cross-sectional shape may be employed if desired. That is, the centre region 5 of each side arm 6 may be of circular cross-section. Regardless of the sectional shape employed, the actual size of the side arms 6 is reduced towards the longitudinal centre of the link (i.e., towards the transverse bar 4), and it is preferred that the minimum size occurs substantially at that centre. In the preferred form shown in FIG. 2, that reduction of necking is curved so that in longitudinal cross-section the transverse surfaces 12 of each side arm 6 are concave.

In the preferred form shown, the side arms 6 are reduced to a section depth equal to approximately one half Ro plus 12½% of Ro, but other relationships may be employed. It may be also convenient to have the section width slightly less than the section depth at the region of minimum size.

The side arms 6 are of course curved in plan view as shown in FIG. 1 to produce the desired elliptical shape, and it is generally convenient to have the maximum inside transverse dimension of the link substantially equal to one half the maximum inside longitudinal or pitch dimension (ie., the distance between the inside surface 9 of the end portions 3 measured along the longitudinal axis of the link). The outside surface 13 of each side arm 6 follows an arc having a radius Rs which is preferably substantially equal to the pitch dimension, at least for part of its length in the centre region 5 of the link.

In a link as described, the transverse bar 4 is located substantially midway in the length of the link body 2, and it is generally convenient to form that bar with a circular cross-sectional shape as shown in FIG. 2. The diameter of the bar 4 is preferably substantially equal to the minimum section depth of the side arms 6, but it may be smaller than that depth under some circumstances. The bar 4 supports the side arms 6 against inward collapse thereby allowing those arms to withstand high loads in spite of their reduced sectional size.

A link according to the invention is extremely strong and yet light in weight by comparison with conventional links. For example, a 13 inch link formed in accordance with the preferred embodiment described will weigh approximately 98 pound, whereas a conventional 12 inch rectangular link of comparable strength weighs approximately 112 pound. This provides a large saving in material and weight when considered over long lengths. That is, a 26 foot length of chain including the improved length will weigh approximately 1,960 pound as against 2,912 pound in the case of the aforementioned conventional link.

It is to be understood that various alterations, modifications and/or additions may be introduced into the preferred construction and arrangement of parts previously described, without departing from the spirit or ambit of the invention as defined by the appended claims.

Having now described my invention, what I claim as new and desire to secure by Letters Patent Is:

1. A chain link including; an elongate body section comprising a bar formed as a closed loop; a transverse bar extending between and interconnecting two longitudinal side portions of said body section, at a location intermediate the length of said body section; the cross-sectional size of said body section bar being smaller intermediate the length of each said side portion than at the end portions of said body section; the transverse surfaces of each said side portion of the body section being concave, and the outside surface of each said side portion is convex and follows an arc having a radius substantially equal to the pitch length of said chain link; each end portion of said body section having an inside surface facing generally towards said transverse bar and an outside surface facing away from said transverse bar, both said inside and outside surfaces being curved so as to be convex in transverse cross section, and the curve of said inside surface being flatter than the curve of said outside surface; said inside surface being formed by an inner arcuate face and an outer arcuate face located on each side of said inner arcuate face, the radius of each said outer arcuate face being substantially equal to 62 percent of the radius of said inner arcuate face; said outside surface having a radius equal to substantially 50 percent of the radius of said inner arcuate face and the locus of said outside surface radius being located substantially midway between said inside and outside surfaces.

2. A chain link according to claim 1, wherein the cross-sectional size of each said side portion of said body section bar progressively decreases from each end portion of the body section towards said transverse bar.

3. A chain link according to claim 2, wherein the cross-sectional size of said transverse bar is substantially the same as that of the part of each said side portion of the body section to which it connects.

4. A chain link according to claim 1, wherein said outside surface of each end portion extends through an arc subtended by an angle of approximately 100°.

* * * * *